UNITED STATES PATENT OFFICE.

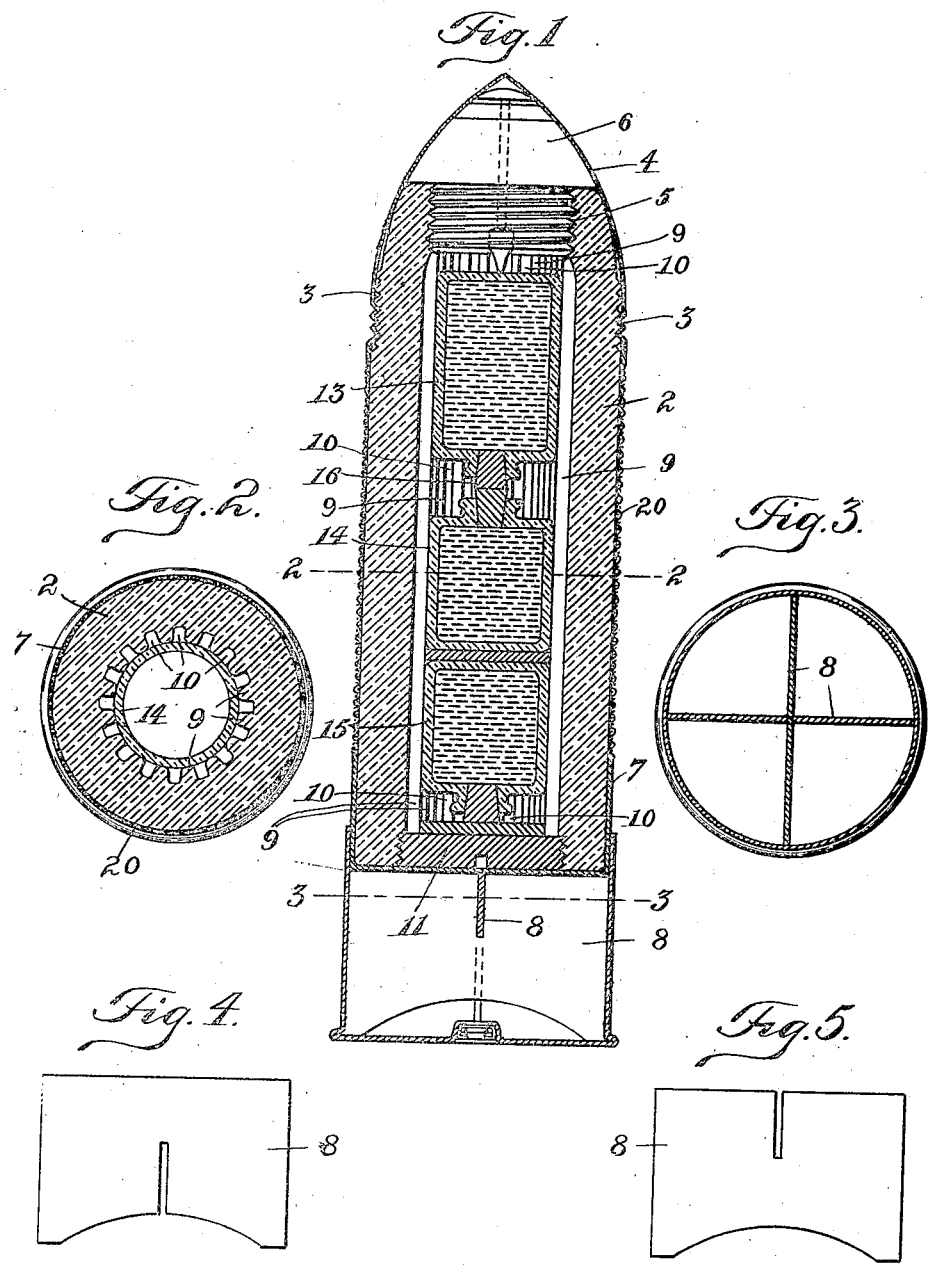

ERIK W. ENEQUIST, OF NEW YORK, N. Y.

PROJECTILE.

1,316,148.

Specification of Letters Patent.

Patented Sept. 16, 1919.

Application filed July 16, 1918. Serial No. 245,473.

*To all whom it may concern:*

Be it known that I, ERIK W. ENEQUIST, a citizen of the United States, residing at New York city, in the county of New York and State of New York, have invented certain new and useful Improvements in Projectiles, of which the following is a specification.

This invention relates to projectiles for war purposes, and to the method of making the same, it more particularly relating to an improvement in explosive shells, the object of the invention being to provide a non-revolving glass shell or one made of modified furnace slag obtained as by-products from smelting furnaces adapted to be fired through a smooth bored gun.

The shells or projectiles may be formed in automatic glass bottle making machinery or may be produced by hand very rapidly and cheaply in the same manner as is now practised for the making of glass bottles or pressed glass.

In the making of these shells, the same are annealed in such a manner as to stand rough handling, but when they break from a shock or pressure from the inside, the glass projectile will disintegrate almost completely into small and sharp pieces, which have enough penetrating power to be effective. Accidental explosions of glass bottles have proved the deadly qualities of glass splinters.

The object of this invention is to further save the use of copper, brass, lead and iron. When large quantities of these metals are thrown against an enemy, they can be collected and proved valuable to the enemy, which would not be the case with glass shrapnel.

The glass shells may be shaped in iron molds of a certain diameter and may be projected by means of a spring action or compressed air or other approved methods through suitable steel smooth bored tubes of suitable diameter, and these shells are so constructed and fitted that they will fall front end or nose end downward, causing an explosion of the same. They also may be shot out by a small amount of powder, as by means of a mortar, or gun, especially when it is desired to project them for a considerable distance.

Shells of this character are particularly adapted for meeting frontal attacks in warfare where great waves of infantry are employed, or as bombs dropped from the air, and also useful to clear out trenches. The glass shells being fired through a smooth bore, are not designed to be thrown more than one thousand yards, at which distance or less a completely loaded shell will burst either by a time or contact fuse or both, or from concussion, and chemical causes. The shrapnel and chemicals which may be employed are such as to have a tendency to destroy gas masks by igniting the same and the gas generated would be most dangerous to life and the spray therefrom would set most everything on fire. It is believed that the effect of this glass projectile would be so terrorizing that an enemy would refuse to charge in frontal attacks.

In some cases the shells may be loaded with only a single glass bottle, which fills the shell excepting the grooves or recesses thereof, which may be filled with a high explosive, such as T. N. T. This glass bottle may contain crushed and screened glass tubing treated in a suitable manner, thus holding deadly ingredients.

The advantages of a glass shell over a cast iron or metal shell are many. The expense of manufacture of the former is less than one-tenth of the latter. A molded five inch shell as it comes from the machine or mold does not cost more than three cents per pound or fifty cents per shell. A complete five inch shell with three glass bottles loaded with chemicals and explosives will weight about twenty-five pounds and cost about three dollars. The country's present daily capacity for the manufacture of such glass shell in normal times is at least two hundred thousand. The chemicals needed are now available and the increase of manufacture of same could readily be arranged for.

A glass shell, by means of annealing, could be made to burst almost at will and disintegrate completely. The close proximity of the enemy against which it may be used and the impregnation of the shell contents would render the glass shrapnel most deadly.

In the drawings accompanying and forming part of this specification, Figure 1 is a longitudinal sectional view of this improved shell; Fig. 2 is a cross sectional view thereof taken on line 2—2 Fig. 1; Fig. 3 is a cross sectional view taken on line 3—3 Fig. 1; and Figs. 4 and 5 are detail views of the rear end of the shell.

Similar characters of reference indicate corresponding parts in the several figures of the drawings.

The non-revolving glass shell 2 is provided with threads 3 on its exterior at its forward or nose end for the reception of a nose 4 of suitable thin metal. The metal sleeve 4 is perforated in such a manner that the time fuse will ignite upon the discharge of the projectile. The front cover or cap 4 also helps to strengthen the shell. The shell is also provided on its interior at its forward end with threads 5 for the reception of a plug 6, which plug may be of any suitable construction and is usually made in two parts, between which the fuse is located. The plug is also held in place by the reinforcing metal sleeve 4.

The rear or bottom of the shell is provided with a metal sleeve 7, to which a cross shaped vane or rib 8 is secured, so as to properly balance the projectile. The inside of the glass projectile is provided with ribs 9 forming recesses 10 and the bottom is provided with a cork disk or breech plug 11 threaded or pressed into the interior of the shell. As hereinbefore stated, in one form the inside of the shell may consist of a single glass bottle, or it may consist of several glass bottles, in the present instance three as 13, 14, and 15, being shown. These bottles are provided with stoppers of glass or some suitable material as 16.

After the shell is constructed, a concussion or time fuse cap or plug hereinbefore referred to may be inserted at the front end, while the sleeve at the rear end protects the glass shell from shocks and also assists in the proper air-tight fitting in the smooth bored steel barrel of the gun or mortar. There may be from eight to twenty, more or less, ribs or recesses on the inside forming comparatively deep grooves or recesses for the purpose of holding the explosive charge while the space inside of the shell may, as hereinbefore stated, hold one or several glass bottles, each of which may be more or less charged with chemicals. These bottles are so arranged that should the time fuse or contact fuse fail to work, the glass bottle will burst from the contact by falling from a considerable height, thus causing explosion of the shell.

The loading charges or contents of the bottles are not claimed in this application, as it is believed it will be consistent with public policy not to disclose them at the present time, but I may say that gas masks will be less useful and the slightest flesh wound may prove fatal.

For the purpose of protecting the glass projectile while it is being shot from the gun, also against explosive effect of the powder used for projecting the projectile, and also any rough handling during transportation, a suitable woven cotton cover 20 may be used around the projectile impregnated with some suitable material, as tallow, grease or paraffin, which thus acts as a lubricator and materially facilitates the passage of the projectile. This impregnated cover thus not only protects the projectile during its passage in the gun, but also during its packing and shipment.

This cover, of some suitable fabric material, will most suitably be located around the exposed glass portion of the projectile, that is between the opposed edges of the reinforcing nose piece 3, and reinforcing sleeve 7, and will thus insure a gas-tight packing in the process of being fired.

I claim as my invention:

1. A non-revolving projectile comprising a glass shell having a reinforcing metal sleeve around its rear end and sides, the major part of the sides of said glass shell being free of metal protection.

2. A projectile comprising a glass shell having a reinforcing metal nose piece, and a reinforcing metal sleeve at the rear end of said shell, the major part of the sides of said glass shell being free of metal protection.

3. A non-revolving projectile comprising a glass shell adapted to be fired from a smooth bored gun or tube and having one or more glass receptacles therein for the reception of a chemical.

4. A non-revolving projectile comprising a glass shell adapted to be fired from a smooth bored gun or tube and having a plurality of explosive receiving recesses interiorly thereof, and also having one or more glass receptacles therein.

5. A non-revolving projectile comprising a glass shell adapted to be fired from a smooth bored gun or tube and having a plurality of recesses interiorly thereof for the reception of an explosive material, one or more glass receptacles therein, and a reinforcing nose piece, the major portion of said shell being free of metal protection.

6. A projectile comprising a glass shell having a reinforcing metal nose piece, a reinforcing metal sleeve at its rear end, and a non-metallic cover for the glass portion of said shell located between the nose piece and the sleeve.

7. A non-revolving projectile comprising a glass shell adapted to be fired from a smooth bored gun or tube and having a plurality of recesses interiorly thereof for the reception of an explosive material, one or more glass receptacles therein, a reinforcing nose piece, and a reinforcing sleeve at its rear end, said nose piece and sleeve leaving the major part of said shell unprotected by metal.

8. A non-revolving projectile comprising a glass shell adapted to be fired from a smooth bored gun or tube and having a plurality of recesses interiorly thereof for the reception of an explosive material, one or more glass receptacles therein, a reinforcing nose piece, a reinforcing sleeve at its rear end, said nose piece and sleeve leaving the major part of said shell unprotected by metal, means connected with said sleeve for balancing the projectile, and a non-metal protecting portion located between said nose piece and sleeve.

9. A projectile comprising a glass shell having means at its forward end for exploding it, and containing one or more glass receptacles therein, said shell having a reinforcing sleeve at its forward and at its rear end constructed to leave the major portion of the sides of said shell unreinforced by metal.

10. A projectile comprising a glass shell having interiorly threaded front and rear ends and threaded closures therefor, said shell also having exterior threads at its forward end for the reception of a reinforcing nose piece.

11. A projectile comprising a glass shell having interiorly threaded front and rear ends and threaded closures therefor, said shell having exterior threads at its forward end for the reception of a reinforcing nose piece, said shell also having interiorly thereof one or more chemical receiving glass receptacles.

12. A projectile comprising a glass shell having interiorly threaded front and rear ends and threaded closures therefor, said shell having exterior threads at its forward end for the reception of a reinforcing nose piece, said shell also having interiorly thereof one or more chemical receiving glass receptacles, and also having a plurality of ribs forming recesses for the reception of an explosive.

13. A projectile comprising a glass shell having the major portion of its sides protected by a non-metallic cover and its forward and rear ends protected by metallic members terminating at the ends of said non-metallic cover.

14. A projectile comprising a glass shell having the major portion of its sides protected by a non-metallic cover and its forward and rear ends protected by metallic members terminating at the ends of said non-metallic cover, said glass shell having a front and rear opening, one of which is of substantially the same diameter as the bore of said shell, and one or more glass receptacles located in said shell.

Signed at 1822 Park Row Building, New York city, county and State of New York, this 17th day of July, 1918.

ERIK W. ENEQUIST.